United States Patent
Carswell et al.

[11] Patent Number: 5,837,932
[45] Date of Patent: Nov. 17, 1998

[54] COVER PANEL FOR ELECTRICAL RECEPTACLES

[75] Inventors: Kent P. Carswell, Midland; Chris E. Leitch, Victoria Harbor, both of Canada

[73] Assignee: Plug—Eze, Canada

[21] Appl. No.: 977,471

[22] Filed: Nov. 24, 1997

Related U.S. Application Data

[60] Provisional application No. 60/031,927 Nov. 27, 1996.

[51] Int. Cl.⁶ ................................................ H05K 5/03
[52] U.S. Cl. ........................... 174/66; 220/241; 439/374; D8/353
[58] Field of Search .............................. 174/66; 220/241, 220/3.8; 439/374; D8/353; D13/156

[56] References Cited

U.S. PATENT DOCUMENTS

| D. 180,505 | 6/1957 | Brounn ........................................ D8/353 |
| D. 261,135 | 10/1981 | Horne ................................... D13/156 X |
| D. 298,733 | 11/1988 | Pool .......................................... D8/353 |
| 2,145,447 | 1/1939 | Klingon ....................................... 174/66 |
| 2,430,514 | 11/1947 | Knausz .................................... 174/66 X |
| 4,059,327 | 11/1977 | Vann ....................................... 174/66 X |
| 4,209,216 | 6/1980 | Brooks ...................................... 439/374 |
| 4,504,698 | 3/1985 | Greenwood ............................... 174/66 |

FOREIGN PATENT DOCUMENTS

| 108720 | 10/1939 | Australia ............................ 439/374 X |
| 63-292588 | 11/1988 | Japan .................................. 439/374 X |

*Primary Examiner*—Dean A. Reichard
*Attorney, Agent, or Firm*—Gifford, Krass, Groh, Sprinkle, Patmore, Anderson & Citkowski, P.C.

[57] ABSTRACT

A guide panel for use with wall mounted electrical outlets of the type used to receive two connector plugs and having a cover plate of a type to form two apertures for receiving the plug receiving portion of the electric outlet or a single aperture for receiving the double plug receiving portion of a electrical outlet. The guide panel can be used to cover the electric outlet alone or the electrical outlet and its associated cover plate. The guide panel is provided with guide surfaces associated with each of the plug receiving portions of the electric outlet to form funnel like guide surfaces for guiding the prongs of an electrical connector into alignment with the electrical outlet.

17 Claims, 3 Drawing Sheets

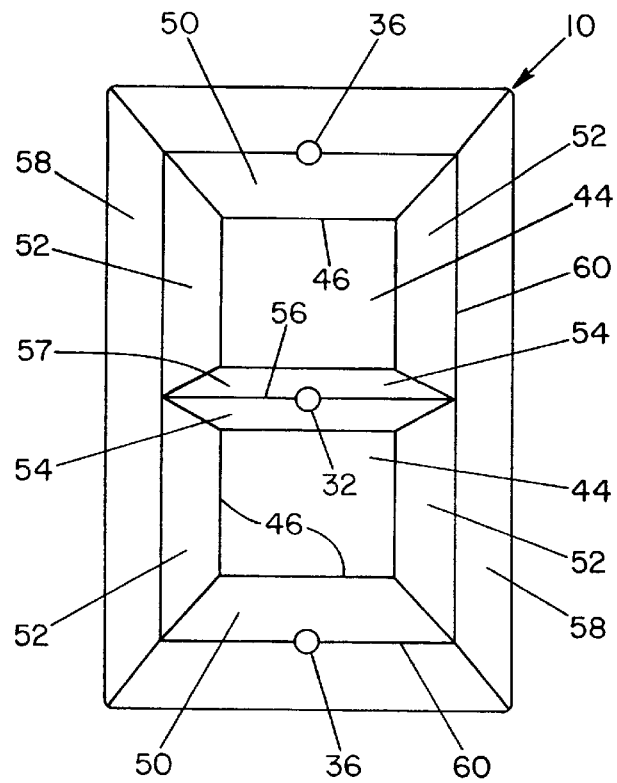
FIG. 5
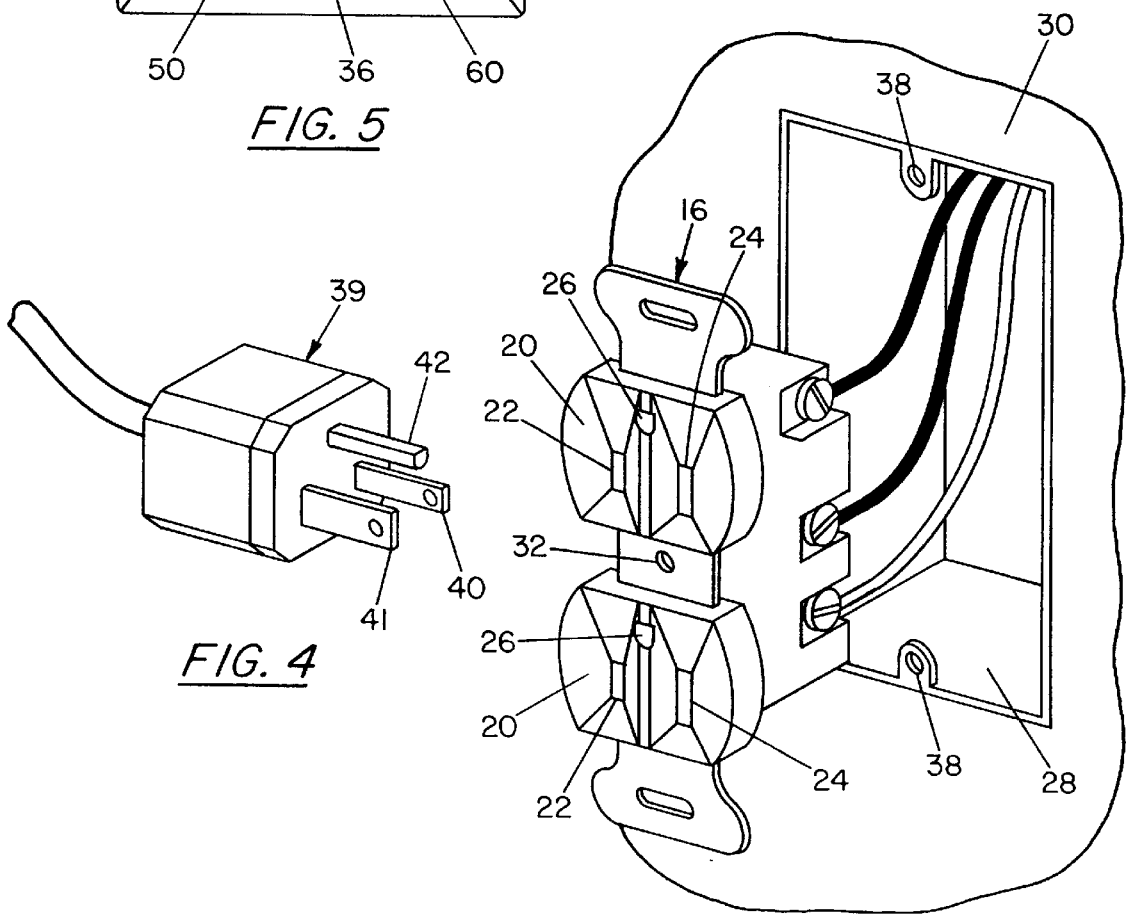
FIG. 4
FIG. 6

COVER PANEL FOR ELECTRICAL RECEPTACLES

This application claims the benefit of U.S. Provisional application Ser. No: 60/031,927 filed Nov. 27, 1996.

This invention relates to cover plates for electric receptacles or outlets and more particularly cover plates or panels for guiding a plug into mating relationship with the outlet.

Cover plates for electric receptacles have been provided with guide surfaces for guiding the prongs on an electric plug to assist in alignment of the plug and the receptacle. Such arrangements are of assistance when an outlet is out of view and is of particular assistance to the sightless and physically handicapped. Such prior art cover plates typically have replaced the conventional cover plate. Unfortunately, such prior art guide-type cover plates are not adaptable for use with all present day outlet assemblies which take two standard forms. One of the forms is an outlet assembly having a duplex receptacle and a cover plate having a pair of openings to accommodate the two plug receiving portions of the receptacle. Still another form, referred to as a decor or designer version, has a single rectilinear opening to receive a specially formed duplex receptacle. Most of the prior art guide-type cover plates are not usable with the latter type of outlet assembly.

Also, in the prior art arrangements the cover plate of the outlet assembly must be removed and replaced with the cover plates affording the guiding features. Although the removal and replacement of cover plates is a relatively easy matter, there is reluctance on the part of some people to even temporarily expose the electrical receptacles by removing the cover plate.

It is highly desirable to have guide functions in a cover panel which can be used to cover an existing electrical outlet assembly including its existing cover plate. It is also desirable that such a guiding cover panel can be used with conventional double orifice cover plates or with the designer-type cover plates which have a single opening for the duplex receptacle.

It is an object of the invention to provide a cover plate or panel for covering an existing outlet assembly made up of a duplex receptacle and a cover plate for that receptacle in which the panel affords guide surfaces extending from a plane spaced from the wall in which the outlet assembly is mounted towards the plug receiving portions of the electrical receptacle.

It is another object of the invention to provide a cover plate panel which covers an entire outlet assembly made up of a duplex receptacle and cover plate adaptable to cover either a double orifice cover plate or a single orifice decorator plate.

Still another object of the invention is to provide a guide panel for electric outlet assemblies which can be mounted over the existing cover plate, or if desired can be used to replace the existing cover plate of either of two types of cover plate now in common use.

The objects of the invention are accomplished by a guide panel or cover plate for covering an existing duplex electrical receptacle or outlet member and its cover plate in which the panel member has a generally rectilinear frame like configuration with a perimeter slightly larger than the existing cover plate and a pair of guide orifices in alignment with a pair of plug receiving portions in the receptacle member. The pair of orifices or cavities having edges or lips overlapping the two plug receiving outlet portions of the receptacle member. Guide walls or surfaces extend in all directions away from the edges of the panel orifices and terminate in outer ridge or frame portions spaced away from the wall in which the receptacle and cover plate are mounted to define sloping guide surfaces for an electric plug. The guide surfaces converge much like a funnel on each of the two receptacle portions of the outlet assembly.

DESCRIPTION OF THE DRAWINGS

FIG. 4 is a perspective view of an electric plug to be received in the receptacle assembly;

FIG. 5 is a plan view of the cover panel alone, without corresponding receptacles;

FIG. 6 is a perspective view of a duplex receptacle in relation to a wall mounted junction box;

DETAILED DESCRIPTION

Figure 7:
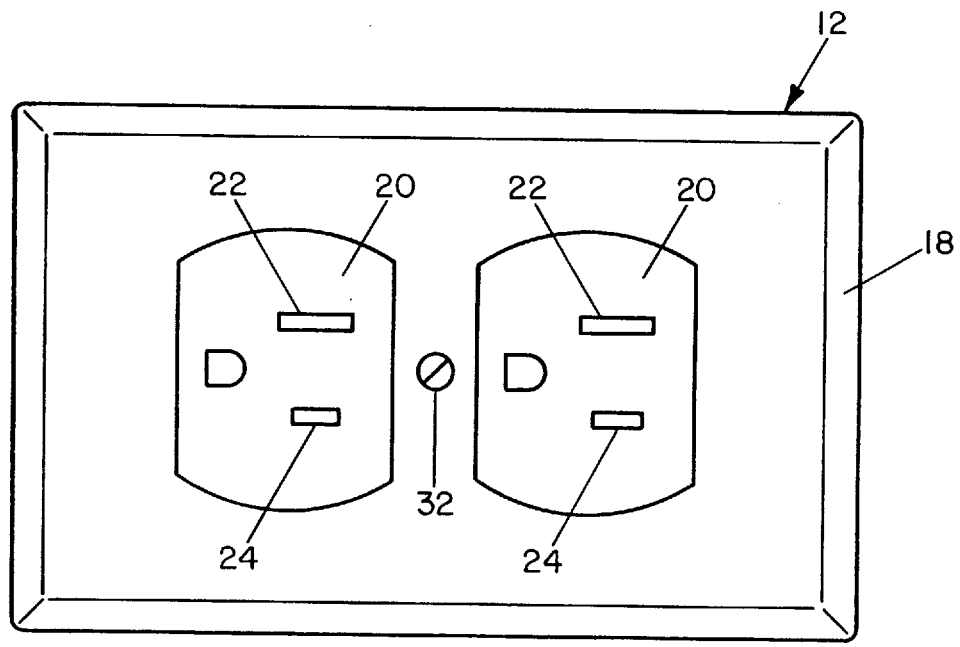
FIG. 7 is a view of one type of duplex receptacle and its associated cover plate making up an outlet assembly.
Figure 8:
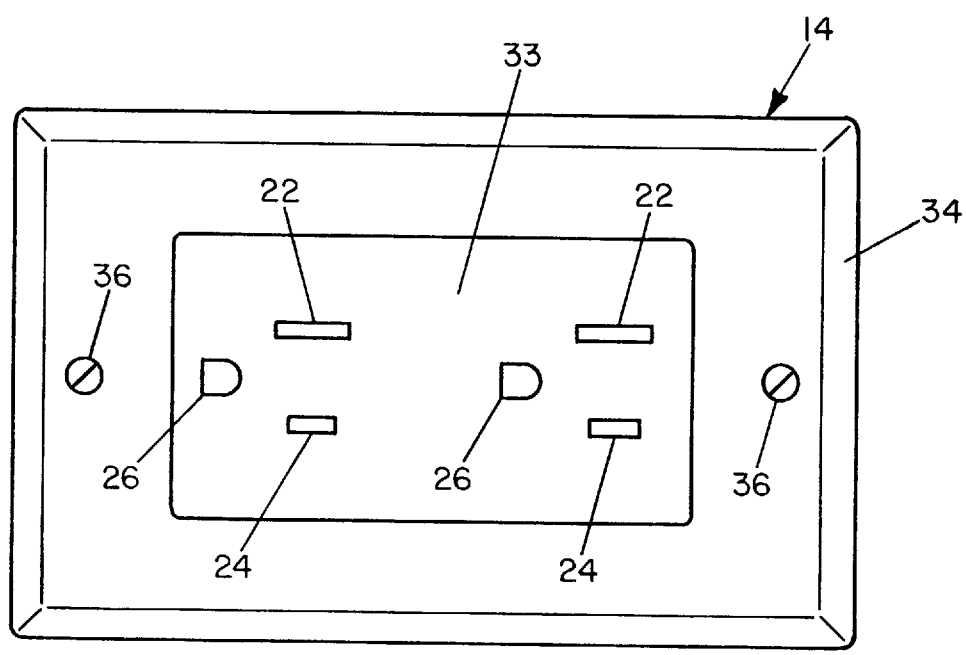
FIG. 8 is a view of a second type of receptacle and cover plate assembly of a more modern or decorator-type outlet assembly.

The guide panel of the present invention is designated generally at 10 and is adapted for use with conventional electric outlet assemblies of two different forms designated at 12 and 14 in FIGS. 7 and 8, respectively.

The electrical outlet 12 includes a receptacle 16 and a cover plate 18. The receptacle 16 includes a pair of plug receiving members 20 each of which has a hot slot 22, a neutral slot 24 and a ground slot 26 connected to respective wires in a junction or outlet box 28 recessed in a wall 30. This is a form of outlet assembly which has been available for many years. In such an arrangement, the cover plate 18 is held in position relative to the plug receiving members 20 by a single screw in an opening designated at 32 and located between the plug receiving members 20.

The outlet assembly 14 seen in FIG. 8 is of a more recent vintage and differs from the outlet 12 in that a single plug receiving member 33 is formed with two sets of hot, neutral and ground slots 22, 24 and 26, respectively. In this case, the cover plate 34 is held in position by two screws in openings indicated at 36 in FIG. 8 and also aligned with the openings in mounting tabs 38 in the junction box 28, seen in FIG. 6.

Outlets 12 and 14 are designed to receive line plug 39 which as seen in FIG. 4 includes prongs or blades 40, 41 and 42 to be received in hot slot 22, neutral slot 24 and ground slot 26, respectively.

Figure 1:
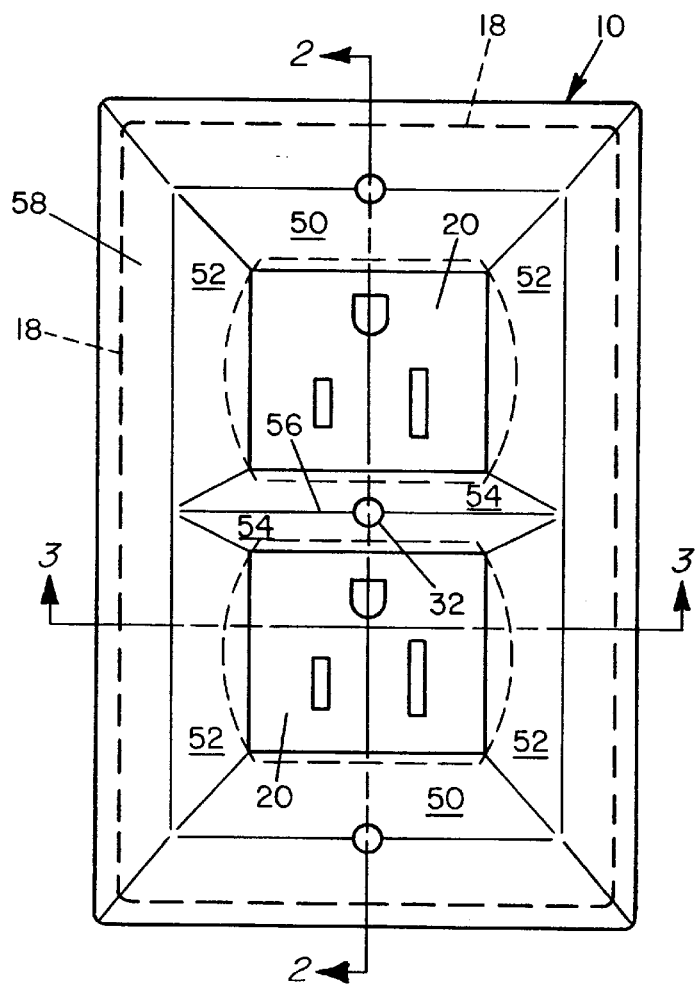
FIG. 1 is plan view of the guide panel of the present invention in position covering a duplex receptacle member and its cover plate.
Figure 2:
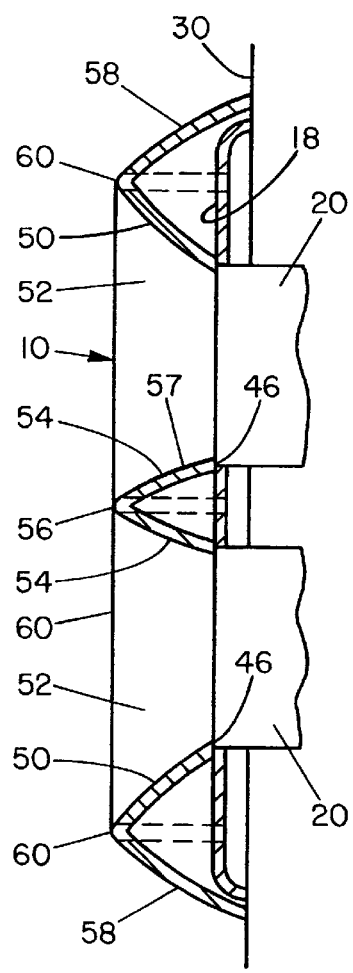
FIG. 2 is a cross-sectional view taken on line 2—2 in FIG. 1.
Figure 3:
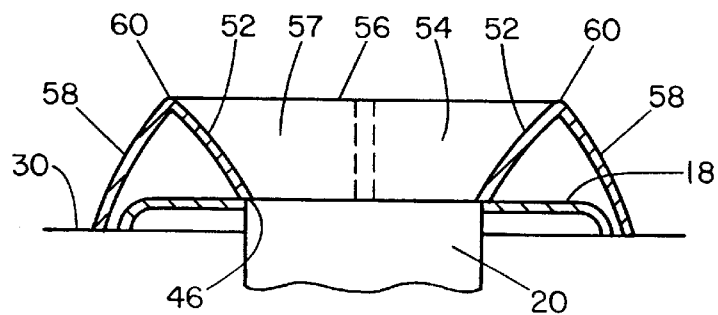
FIG. 3 is cross-sectional view taken on line 3—3 in FIG. 1.

The guide panel 10 of the present invention is intended for use with either form of outlet 12 or 14. The guide panel 10 is generally rectangular and has an overall thickness much greater than the thickness of a conventional cover plate 18. The relative thickness of the guide panel 10 and the cover plate 18 can be compared in FIG. 2. The guide panel 10 forms a generally raised frame around the plug receiving areas of the receptacle 16. The panel 10 has a pair of plug receiving apertures 44 for alignment with the plug receiving members 20. The apertures 44 have edge or lip portions 46 which overlap the plug receiving members 20. In other words, the overall dimensions of the openings in the guide panel 10 are somewhat smaller than the outer dimensions of the face of the plug receiving members 20 so that the guide panel overlaps the plug receiving members 20. In the case of the outlet 14 seen in FIG. 8, the face of the receptacle 16 is flat so the edges or lip portion 46 come into contact with that surface in alignment with the plug receiving portions. As best seen in FIG. 5, the walls of the panel 10 slope outwardly and away from the face of the plug receiving members to form guide surfaces 50 at the opposite ends of the guide panel 10, guide surfaces 52 at opposite sides at each of the plug receiving members 20 and guide surfaces 54 which converge and meet to form a ridge 56 of a partition or cross-member 57. The guide surfaces 50 and 52 meet with peripheral wall portions 58 to form a ridge indicated at 60 and coextensive with ridge 56 of partition member 57 in slightly spaced relationship to the outer edge of the original cover plate 18 or 34, as seen in connection with the cover plate 18 in FIG. 1. The peripheral wall portions 58 of the panel 10 extend into contact or at least close proximity to the surface of the wall 30 in which the outlet is supported.

The guide panel 10 is intended to be secured in position relative to outlet 12 or 14 so that the guide panel covers the entire outlet including the cover plates 18 and 34 and so that the guide surfaces 50, 52 and 54 overlap the face of the plug receiving members 20 seen in FIG. 7 and surround the plug receiving portions of the member 33 in FIG. 8. The mounting of panel 10 can be accomplished in one of several methods. In a preferred embodiment of the invention, the panel 10 can be provided with a single screw receiving opening 32 for use with the outlet assembly 12 seen in FIG. 7, or it can be provided with a pair of screw receiving opening 36 for use with the outlet assembly 14 seen in FIG. 8. The manufacture of the two types of guide panels 10, which would be required, simply requires die inserts so that the guide panel 10 can be formed with a single central screw opening 32 or with a pair of screw openings 36. In an alternative form, the guide panel 10 can be formed with three screw receiving openings 32 and 36 so that the guide panel 10 becomes usable with either form of duplex outlet 12 or 14 as seen in FIGS. 7 and 8, respectively. In each of these mounting arrangements the existing screws in the cover plates 12 or 14 are removed and replaced with a longer screw or screws to extend from the ridge 56 and ridge 60 to the original openings in the cover plates 18 and 34.

In use, the surfaces 50, 52 and 54 serve as guides to engage the ends of prongs 40, 41 and 42 so that the line plug 39 is confined and as the plug 39 approaches the prong receiving slots 22, 24 and 26 the area of confinement becomes smaller to assist in final alignment of the plug 39 and plug receiving members 20 or 33.

A guide panel 10 has been provided which covers not only the outlet or receptacle but also its cover plate so that guide surfaces overlap the face of the plug receiving member to provide fennel-like guide surfaces for guiding the prongs 40, 41 and 42 into alignment with the hot, neutral and ground slots of the receptacle. The same general configuration of cover panel is used for both types of wall outlets in common use, that is the two aperture cover plate or the single aperture cover plate, both of which are adapted to receive two electrical plugs.

We claim:

1. A guide panel for attachment to a wall mounted, dual plug receiving electrical outlet, comprising:
   a rectilinear body member having a wall face and a room face spaced from each other,
   an outer peripheral wall around said body member and having opposed sides and ends, said peripheral wall forming a lip for engagement with a building wall,
   an inner peripheral wall merging with said outer peripheral wall to form a border ridge portion and having a wall surface extending from said border ridge portion to engage said electrical outlet, a partition wall between said opposed ends, said partition wall having a ridge portion coextensive with and merging with said border ridge portion associated with said sides and forming diverging wall surfaces extending into engagement with the electrical outlet, and
   a pair of plug receiving cavities defined by said inner peripheral wall and diverging wall surfaces and extending from said ridge portion and from said border ridge portion to said electrical outlet for receiving and guiding a plug into mating relationship with said electrical outlet.

2. The guide panel of claim 1 wherein said rectilinear body member defines a cavity at said wall face to receive a wall plate when said guide panel is in position relative to said electrical outlet.

3. The guide panel of claim 1 wherein said pair of plug receiving cavities are larger adjacent to said ridge portion and said border ridge portion than adjacent to said electrical outlet.

4. The guide panel of claim 1 and further comprising connector means for attaching said guide panel to said electrical outlet.

5. The guide panel of claim 4 wherein said connector means are associated with each end of said guide panel for attaching said guide panel to said electrical outlet.

6. The guide panel of claim 4 wherein said connector means for attaching said guide panel to said electrical outlet are associated with said partition wall.

7. The guide panel of claim 1 wherein said plug receiving cavities are generally rectilinear and decreasing in cross-section from adjacent said ridge portion and said border ridge portion to adjacent said outlet.

8. A guide panel for attachment to a dual plug receiving, wall mounted electrical outlet having a rectangular cover plate, comprising:
   an outer peripheral wall extending from a perimeter of said guide panel at sides and ends thereof and projecting outwardly from a building wall to form a peripheral ridge portion,
   a partition wall extending intermediate said ends of said guide panel and extending from said plug receiving outlet to an intermediate ridge portion coextensive with said peripheral ridge portion, and
   inner peripheral walls extending from said peripheral ridge portion to said plug receiving outlet and acting with said partition wall to form a pair of plug receiving cavities adjacent to said electrical outlet for guiding a plug into mating relation with said electrical outlet.

9. The guide panel of claim 8 and further comprising a recess formed by said peripheral wall adjacent to said building wall mounting said outlet to receive said rectangular cover plate.

10. The guide panel of claim 8 wherein said plug receiving cavities are larger adjacent to said ridge portions than adjacent to said electrical outlet.

11. The guide panel of claim 8 wherein said guide panel is attached to said dual plug receiving receptacle.

12. The guide panel of claim 8 wherein said guide panel is attached to said receptacle with a single fastener.

13. The guide panel of claim 8 wherein said guide panel is attached to said receptacle with a pair of fasteners.

14. A guide panel for attachment to a wall mounted, duplex electrical outlet having two plug receiving receptacles, comprising:

a pair of side and a pair of end peripheral walls defining a rectilinear area around said outlet and extending outwardly from a building wall to form a peripheral ridge portion uniformly spaced from said building wall, a partition wall extending between said side peripheral walls and from said outlet to an intermediate ridge portion coextensive with said peripheral ridge portion, and inner peripheral walls extending from said peripheral ridge portion to said outlet and acting with said partition wall to form a pair of plug receiving cavities adjacent to said outlet for receiving and guiding a plug into mating relation with said outlet.

15. The guide panel of claim 14 wherein a rear surface of said guide panel forms a shallow cavity to receive a cover plate.

16. The guide panel of claim 14 wherein said plug receiving cavities are smaller adjacent to said outlet than adjacent to said ridge portions.

17. The guide panel of claim 14 wherein a cross-sectional area of each of said plug receiving cavities adjacent to said outlet is smaller than a cross-sectional area of each of said plug receiving receptacles.

* * * * *